United States Patent
Hiromitsu

(10) Patent No.: US 11,939,923 B2
(45) Date of Patent: Mar. 26, 2024

(54) LIQUID FUEL INJECTION BODY

(71) Applicant: IHI CORPORATION, Tokyo (JP)

(72) Inventor: Nagayoshi Hiromitsu, Tokyo (JP)

(73) Assignee: IHI CORPORATION, Tokyo (JP)

(*) Notice: Subject to any disclaimer, the term of this patent is extended or adjusted under 35 U.S.C. 154(b) by 638 days.

(21) Appl. No.: 17/134,753

(22) Filed: Dec. 28, 2020

(65) Prior Publication Data

US 2021/0115856 A1 Apr. 22, 2021

Related U.S. Application Data

(63) Continuation of application No. PCT/JP2019/027190, filed on Jul. 9, 2019.

(30) Foreign Application Priority Data

Sep. 6, 2018 (JP) .................................. 2018-167013

(51) Int. Cl.
*F02C 7/232* (2006.01)
*F23R 3/28* (2006.01)

(52) U.S. Cl.
CPC ................. *F02C 7/232* (2013.01); *F23R 3/28* (2013.01); *F05D 2220/32* (2013.01); *F05D 2240/36* (2013.01)

(58) Field of Classification Search
CPC ........ F02C 7/232; F23R 3/28; F05D 2220/32; F05D 2240/36
(Continued)

(56) References Cited

U.S. PATENT DOCUMENTS 3,602,434 A 8/1971 Hruby, Jr.
4,726,182 A * 2/1988 Barbier ..................... F23R 3/14
60/737

(Continued)

FOREIGN PATENT DOCUMENTS

JP 6-218919 A 8/1994
JP 6-281146 A 10/1994
(Continued)

OTHER PUBLICATIONS

Extended European Search Report dated Apr. 25, 2022 in European Patent Application No. 19857033.5, 7 pages.
(Continued)

*Primary Examiner* — Steven J Ganey
(74) *Attorney, Agent, or Firm* — Oblon, McClelland, Maier & Neustadt, L.L.P.

(57) ABSTRACT

Provided is a liquid fuel injection body capable of further reducing a film thickness of an injected liquid fuel. A liquid fuel injection body includes: an annular fuel passage extending in an axial direction and provided inside the liquid fuel injection body, the fuel passage is defined by a fuel passage outer wall located outward in a radial direction and a fuel passage inner wall located inward in the radial direction, a plurality of throttle passages disposed discretely in a circumferential direction are provided at a portion of the fuel passage on an upstream side with respect to a downstream end of the fuel passage, each of the throttle passages is defined by a throttle passage outer wall located outward in the radial direction and formed as a cylindrical surface, a throttle passage inner wall located inward in the radial direction, and two throttle passage side walls connecting end portions of the throttle passage outer wall and the throttle passage inner wall in the circumferential direction, and the throttle passage outer wall and the fuel passage outer wall (Continued)

are flush whereas the throttle passage inner wall and the fuel passage inner wall are not flush.

2 Claims, 4 Drawing Sheets

(58) Field of Classification Search
USPC ........... 239/399, 403–406, 423, 424; 60/734, 60/737, 748
See application file for complete search history.

(56) References Cited

U.S. PATENT DOCUMENTS

| | | | |
|---|---|---|---|
| 4,761,958 A * | 8/1988 | Hellat | F23D 14/20 |
| | | | 60/737 |
| 6,378,787 B1 | 4/2002 | Buchi et al. | |
| 8,943,828 B2 | 2/2015 | Bagchi et al. | |
| 2003/0141383 A1 | 7/2003 | Hayashi | |
| 2004/0011042 A1* | 1/2004 | Inoue | F23R 3/283 |
| | | | 60/737 |
| 2005/0039456 A1 | 2/2005 | Hayashi | |
| 2010/0071374 A1 | 3/2010 | Fox et al. | |
| 2011/0271680 A1 | 11/2011 | Bagchi et al. | |

FOREIGN PATENT DOCUMENTS

| | | | |
|---|---|---|---|
| JP | 8-261 413 A | 10/1996 |
| JP | 11-159757 A | 6/1999 |
| JP | 2003-21 4604 A | 7/2003 |
| JP | 2004-156795 A | 6/2004 |
| JP | 2004-360944 A | 12/2004 |
| JP | 2005-55091 A | 3/2005 |
| JP | 2007-330839 A | 12/2007 |
| JP | 2010-101514 A | 5/2010 |
| JP | 2015-127633 A | 7/2015 |

OTHER PUBLICATIONS

International Search Report dated Sep. 10, 2019 in PCT/JP2019/027190 filed Jul. 9, 2019, 1 page.

* cited by examiner

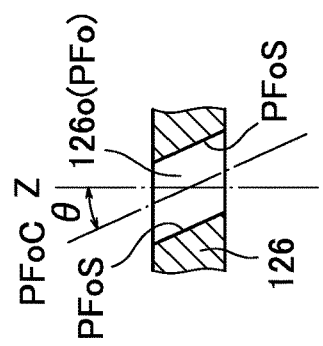
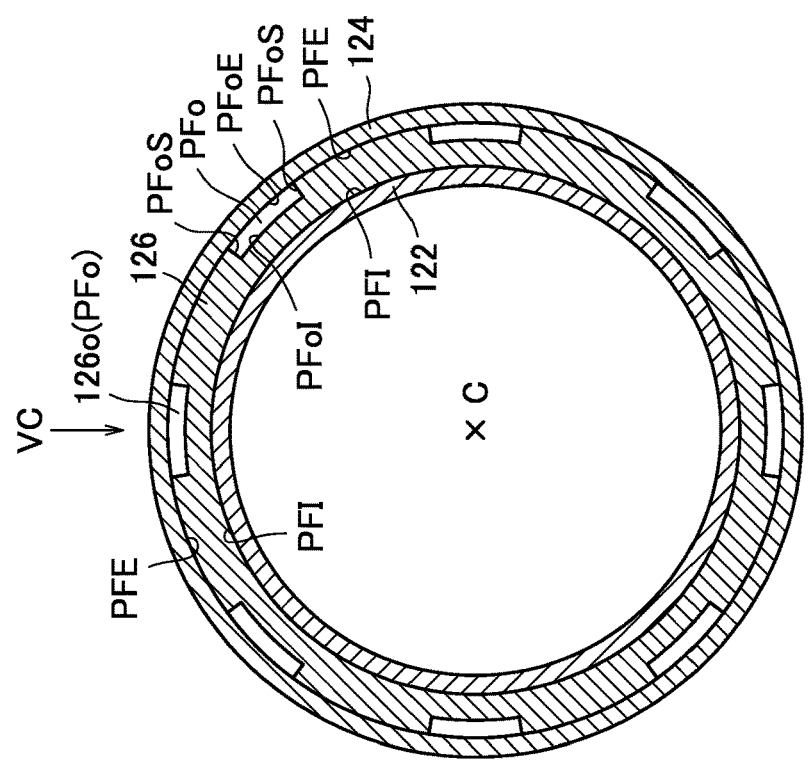
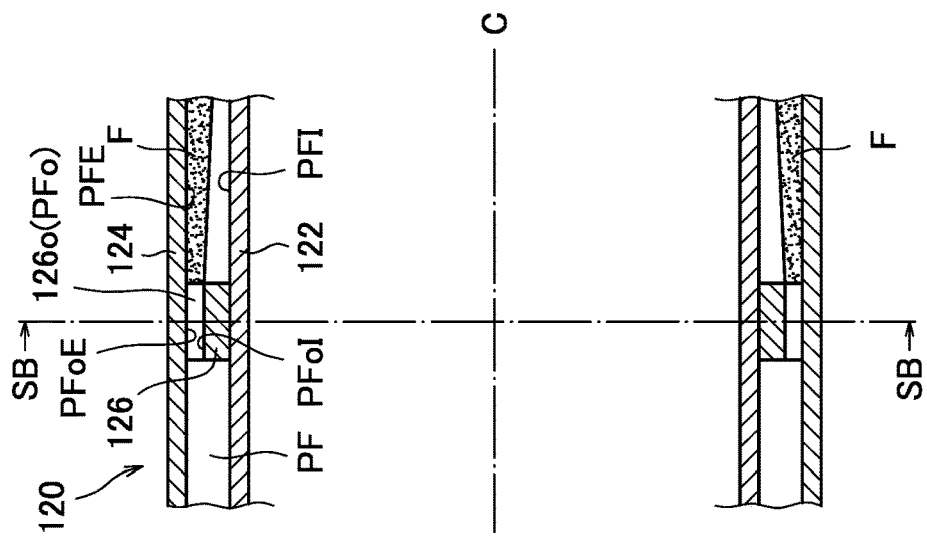

LIQUID FUEL INJECTION BODY

TECHNICAL FIELD

The present disclosure relates to a liquid fuel injection body, particularly to a liquid fuel injection body configured to cause a liquid fuel to flow as an annular liquid film out between swirling air flows for atomization flowing out of annular passages disposed inward and outward in the radial direction in a liquid fuel injector of an air-blast type.

BACKGROUND ART

In a case in which a liquid fuel is combusted in a combustor of a gas turbine, it is desirable to atomize the liquid fuel in order to promote vaporization of the liquid fuel and mixing with combustion air. The atomization of the liquid fuel also contributes to reduction in emission of NOx (nitrogen oxides) as well as unburned fuel and CO (carbon monoxide) through speed of combustion reaction.

An example of an atomization method of the liquid fuel is an air-blast method. This is a method in which a liquid fuel injected in a film form from a liquid fuel injection body is atomized using a shear force caused by a difference in velocity between the liquid fuel and an air flow flowing adjacently to the liquid fuel.

As a liquid fuel injector that employs the air-blast method, there is a liquid fuel injector disclosed in Patent Document 1. The liquid fuel injector (air-blast type fuel nozzle) is configured to atomize a liquid fuel injected as an annular liquid film from a fuel flow path (5) formed between an inner pipe (1) and an intermediate pipe (2) using a shear force acting between inner air (a1) and outer air (a2) flowing adjacently to each other in the radial direction. Also, multiple ribs (4a) that fill a gap between the inner pipe (1) and the intermediate pipe (2) are provided in the radial direction at a downstream end portion of the fuel flow path (5), and a fuel flow path (6) is formed by a throttle groove (4) defined by adjacent ribs (4a). This prevents the fuel flow path (5) from becoming nonuniform in the circumferential direction due to eccentricity between the inner pipe (1) and the intermediate pipe (2), and a fuel liquid film that is uniform in the circumferential direction is formed.

RELATED ART DOCUMENT

Patent Document
Patent Document 1: Japanese Patent Laid-Open No. 8-261413

SUMMARY OF THE DISCLOSURE

Problems to be Solved by the Disclosure

In order to improve atomization performance, that is, in order to further reduce the particle diameters of atomized fuel liquid droplets, in a liquid fuel injector of an air-blast type, it is desirable to make the film thickness of the liquid fuel injected from the liquid fuel injection body as small as possible.

However, since the throttle groove (4) forming the fuel flow path (6) is opened over the entire region between the inner pipe (1) and the intermediate pipe (2) in the radial direction in the liquid fuel injector disclosed in Patent Document 1, the film thickness of the liquid fuel injected through the throttle groove (4) is presumed to be similar to the interval between the inner pipe (1) and the intermediate pipe (2) in the radial direction. In other words, there remains room for improvement in the liquid fuel injector disclosed in Patent Document 1 in terms of making the film thickness of the injected liquid fuel as small as possible.

The present disclosure has been made in view of the aforementioned problem, and an object thereof is to provide a liquid fuel injection body capable of further reducing a film thickness of an injected liquid fuel.

Means for Solving the Problems

In order to achieve the above object, a liquid fuel injection body according to the present disclosure includes: an annular fuel passage extending in an axial direction and provided inside the liquid fuel injection body, the fuel passage is defined by a fuel passage outer wall located outward in a radial direction and a fuel passage inner wall located inward in the radial direction, a plurality of throttle passages disposed discretely in a circumferential direction are provided at a portion of the fuel passage on an upstream side with respect to a downstream end of the fuel passage, each of the throttle passages is defined by a throttle passage outer wall located outward in the radial direction and formed as a cylindrical surface, a throttle passage inner wall located inward in the radial direction, and two throttle passage side walls connecting end portions of the throttle passage outer wall and the throttle passage inner wall in the circumferential direction, and the throttle passage outer wall and the fuel passage outer wall are flush whereas the throttle passage inner wall and the fuel passage inner wall are not flush.

Effects of the Disclosure

According to the liquid fuel injection body of the present disclosure, excellent effects that it is possible to reduce the film thickness of the injected liquid fuel, and in a liquid fuel injector of an air-blast type that incorporates the liquid fuel injection body, it is possible to further reduce particle diameters of atomized fuel liquid droplets can be obtained.

BRIEF DESCRIPTION OF THE DRAWINGS

FIG. 2A is a detailed explanatory diagram of the liquid fuel injection body according to the embodiment of the present disclosure and illustrates an enlarged view of the portion X in FIG. 1.

FIG. 2B is a detailed explanatory diagram of the liquid fuel injection body according to the embodiment of the present disclosure and illustrates the sectional view along SB in FIG. 2A.

FIG. 2C is a detailed explanatory diagram of the liquid fuel injection body according to the embodiment of the present disclosure and illustrates a view in a direction of an arrow VC in FIG. 2B.

MODE FOR CARRYING OUT THE DISCLOSURE

Hereinafter, an embodiment of the present disclosure will be described in detail with reference to drawings.

Figure 1:
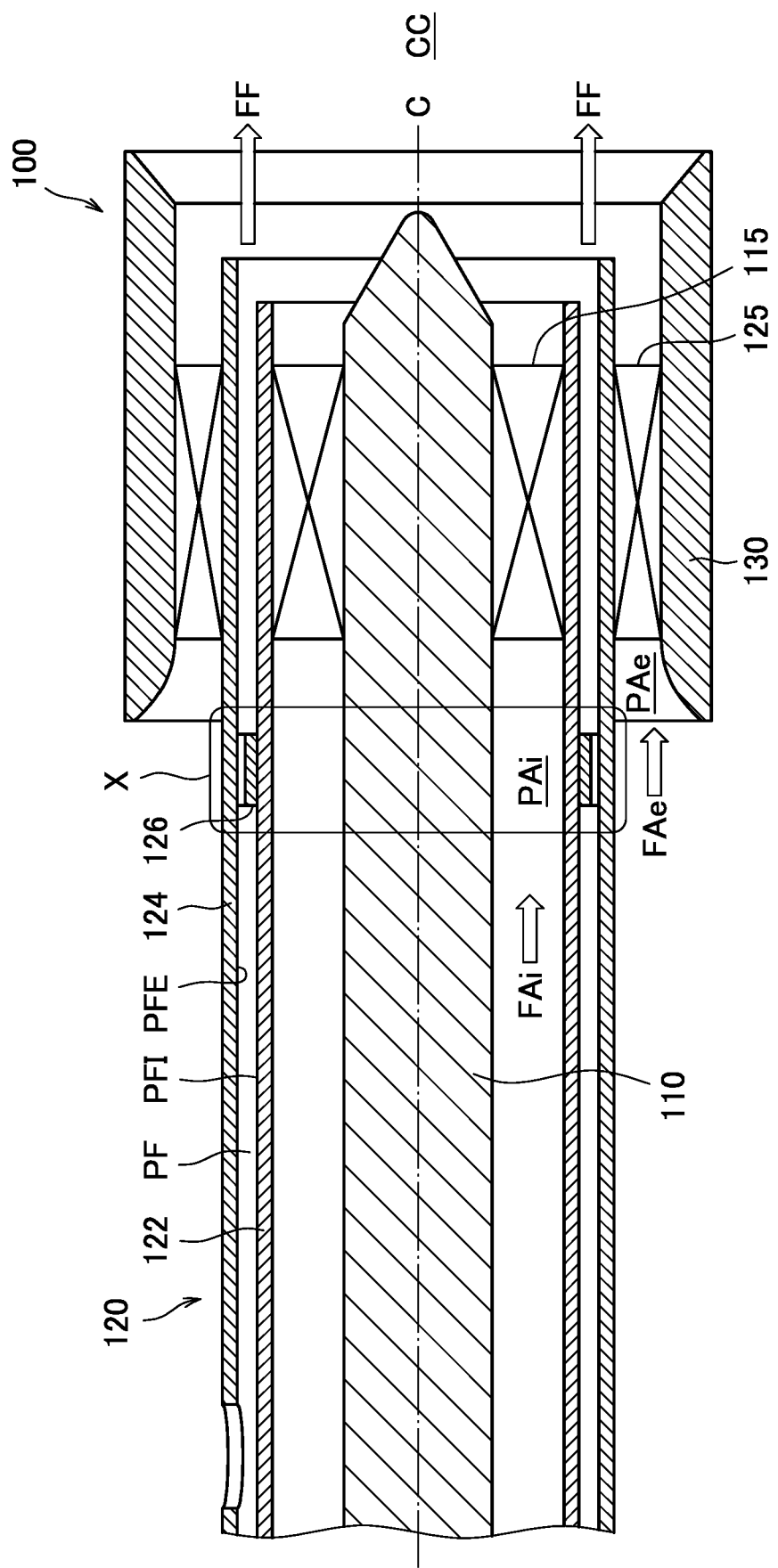
FIG. 1 is a schematic overall sectional view of an air-blast type liquid fuel injector with a liquid fuel injection body incorporated therein according to an embodiment of the present disclosure.

FIG. 1 is a schematic overall sectional view of an air-blast type liquid fuel injector 100 in which a liquid fuel injection body 120 according to the embodiment of the present disclosure is incorporated.

The liquid fuel injector 100 includes a cylindrical center body 110 having a center axis C, an annular shroud 130 disposed concentrically with and outside the center body 110 in the radial direction, and the annular liquid fuel injection body 120 concentrically with the center body 110 and the shroud 130 therebetween.

The liquid fuel injection body 120 includes an inner wall 122 and an outer wall 124, both of which having annular shapes, and an annular liquid fuel passage PF extending in the axial direction (the direction that is parallel with the center axis C) is formed between these two walls. In other words, the outer surface of the inner wall 122 forms the inner wall (fuel passage inner wall) PFI of the liquid fuel passage PF while the inner surface of the outer wall 124 forms the outer wall (fuel passage outer wall) PFE of the liquid fuel passage PF.

Also, orifice walls 126, which will be described later in detail, are disposed at midpoint portions of the liquid fuel passage PF in the axial direction (portions going back from the downstream end (the right end in the drawing) toward the upstream side (the left side in the drawing) by a predetermined distance).

An inner air passage PAi and an outer air passage PAe, each of which having an annular shape, are formed between the center body 110 and (the inner wall 122 of) the liquid fuel injection body 120 and between (the outer wall 124) of the liquid fuel injection body 120 and the shroud 130, respectively. In addition, a plurality of inner swirl vanes 115 and outer swirl vanes 125 are disposed at equal intervals in the circumferential direction in the inner air passage PAi and the outer air passage PAe, respectively.

Air flows into the inner air passage PAi and the outer air passage PAe as represented by the arrows FAi and FAe in FIG. 1, respectively, swirling is applied thereto when the air passes through the inner swirl vanes 115 and the outer swirl vanes 125, and the air flows out to the inside of a combustion chamber CC as a swirling flow having a velocity component in the circumferential direction.

The liquid fuel flows into the annular liquid fuel passage PF from the upstream side of the liquid fuel injection body 120, passes through a plurality of orifices 126o (which will be described later in detail) formed in the orifice wall 126, and is then injected into the combustion chamber CC as an annular liquid film as represented by the arrow FF in FIG. 1 from the downstream end of the liquid fuel injection body 120. At this time, a shear force caused by a difference in velocity from the air flowing out of the inner air passage PAi and the outer air passage PAe in a state in which the air has a velocity component in the circumferential direction as described above acts on the injected liquid fuel, and this leads to atomization of the liquid fuel.

FIGS. 2A to 2C are explanatory diagrams illustrating details of the orifice wall 126 disposed in the liquid fuel passage PF, where FIG. 2A is an enlarged view of the portion X in FIG. 1, FIG. 2B is a sectional view along SB in FIG. 2A, and FIG. 2C is a view in a direction of an arrow VC in FIG. 2B (in other words, the view of the orifice wall 126 when seen from the outside in the radial direction). Note that illustration of the center body 110, which is not the target of the following description, is omitted in FIGS. 2A and 2B.

The orifice wall 126 is a ring-shaped member having the same outer diameter as the inner diameter of the outer wall 124 of the liquid fuel injection body 120 (the inner diameter of the fuel passage outer wall PFE) and the same inner diameter as the outer diameter of the inner wall 122 of the liquid fuel injection body 120 (the outer diameter of the fuel passage inner wall PFI) as illustrated in FIGS. 2A and 2B. In other words, the orifice wall 126 is fitted into the liquid fuel passage PF without generating any gaps from the fuel passage inner wall PFI and the fuel passage outer wall PFE in the radial direction at a portion in the circumferential direction where the orifices 126o, which will be described later, are not provided.

A plurality of (eight in the illustrated example) orifices 126o are provided discretely in the circumferential direction at equal intervals in the orifice wall 126 as illustrated in FIG. 2B.

Each orifice 126o is formed by notching the outer periphery of the orifice wall 126 toward the inside in the radial direction, and as a result, the boundary of the outside of the throttle passage PFo, which is formed by each orifice 126o, in the radial direction is defined by the inner surface (fuel passage outer wall PFE) of the outer wall 124 of the liquid fuel injection body 120. Here, in a case in which the wall (throttle passage outer wall) PFoE located outside the throttle passage PFo in the radial direction is regarded as an independent wall for convenience purpose, it is possible to express that the throttle passage outer wall PFoE and the fuel passage outer wall PFE have continuous surfaces, that is, both the walls are made flush.

On the other hand, the wall (throttle passage inner wall) PFoI located inside the throttle passage PFo in the radial direction is a bottom wall of the notch formed from the outer periphery toward the inside in the radial direction of the orifice wall 126 and does not have a surface that is continuous with the fuel passage inner wall PFI, that is, both the walls are not made flush. Note that the throttle passage inner wall PFoI may be formed as a part of a cylindrical surface centered about the center axis C, may be formed as a plane that is perpendicular to the radial direction, or may be formed as a surface with a shape other than these shapes.

Also, boundaries of the throttle passage PFo on both sides in the circumferential direction are defined by two throttle passage side walls PFoS connecting end portions of the throttle passage inner wall PFoI and the throttle passage outer wall PFoE in the circumferential direction. These two throttle passage side walls PFoS are configured such that a passage center line PFoC of the throttle passage PFo is inclined relative to the axial direction Z (the direction that is parallel with the center axis C), that is, the passage center line PFoC of the throttle passage PFo has an angle θ (0°<θ<90°) with respect to the axial direction Z as illustrated in FIG. 2C. Note that, as long as such a configuration is employed, the shape of the two throttle passage side walls PFoS can be an arbitrary shape, and for example, the two throttle passage side walls PFoS can be formed as two planes that are parallel with the plane including the passage center line PFoC.

The orifices 126o configured as described above allow an injected flow F of the liquid fuel flowing out of each orifice 126o to flow downward inside the liquid fuel passage PF in a state in which the outer surface thereof in the radial direction is in contact with the inner surface (fuel passage outer wall PFE) of the outer wall 124 of the liquid fuel injection body 120 as illustrated in FIG. 2A. On the other hand, the inner surface of the injected flow F of the liquid fuel in the radial direction is not in contact with the outer surface (fuel passage inner wall PFI) of the inner wall 122 of the liquid fuel injection body 120, and as a result, a region where the injected flow F of the liquid fuel is present in the radial direction is limited to the outside of the liquid fuel passage PF.

Also, the passage center line PFoC of the throttle passage PFo inclined with respect to the axial direction Z allows the injected flow F of the liquid fuel to flow out of each orifice 126o in a state in which swirling is applied thereto as illustrated in FIG. 2C. Since a centrifugal force acts on the flow to which the swirling has been applied as described above, the injected flow F of the liquid fuel flowing out of each orifice 126O is pressed against the fuel passage outer wall PFE toward the outside in the radial direction and flows downward while maintaining the contact with the wall and spreading in the circumferential direction. As a result, injected flows F of the liquid fuel flowing out of adjacent orifices 126o are integrated and eventually form one annular liquid film that is continuous in the circumferential direction as a whole.

Also, the liquid film formed in this manner has a thin thickness since the region where the injected flow F of the liquid fuel is present in the radial direction is limited to the outside of the liquid fuel passage PF as described above.

As described above, it is possible to reduce the film thickness of the injected liquid fuel according to the liquid fuel injection body 120 of the embodiment of the present disclosure. It is thus possible to reduce particle diameters of the atomized fuel liquid droplets in the liquid fuel injector 100 that incorporates the liquid fuel injection body 120.

Note that, although the aforementioned description has been provided on the assumption that the orifice wall 126 is a member that is independent from the inner wall 122 and the outer wall 124, the orifice wall 126 may be formed integrally with either the inner wall 122 or the outer wall 124, or the orifice wall 126 may be formed integrally with the inner wall 122 and the outer wall 124 as a whole.

The injected flow F of the liquid fuel flowing out of each orifice 126o is independent from the other injected flows F in an initial stage, the injected flows F gradually spread in the circumferential direction as described above as the injected flows F flow downward in the liquid fuel passage PF, adjacent injected flows F are integrated, and as a result, one annular liquid film that is continuous in the circumferential direction as a whole is eventually formed. At this time, it is possible to further reduce the particle diameters of the atomized fuel liquid droplets as the thickness of the eventually formed annular liquid film is more uniform in the circumferential direction, and to do so, spreading of the injected flows F of the liquid fuel in the circumferential direction is to be promoted. Also, it is possible to quickly form the annular liquid film with the uniform thickness in the circumferential direction if the spreading of the injected flows F of the liquid fuel in the circumferential direction is promoted. This means that the distance from exits of the orifices 126o to the downstream end of the liquid fuel passage PF can be shortened, and this is favorable for applications to gas turbine engines for aircrafts that have a strict requirement for weight reduction, in particular.

Since the injected flows F of the liquid fuel are in contact with the fuel passage outer wall PFE from the beginning of the flowing out of the orifices 126o, configuring the fuel passage outer wall PFE to be likely to be wetted with the liquid fuel is favorable in order to promote the spreading thereof in the circumferential direction.

Thus, it is preferable to provide a structure for improving wettability with respect to the liquid fuel together in the fuel passage outer wall PFE on the downstream side with respect to the orifices 126o in the liquid fuel injection body 120 according to the embodiment of the present disclosure.

Hereinafter, variations of the liquid fuel injection body according to the embodiment of the present disclosure in which the structure for improving wettability with respect to the liquid fuel is provided together will be described.

Figure 3A:
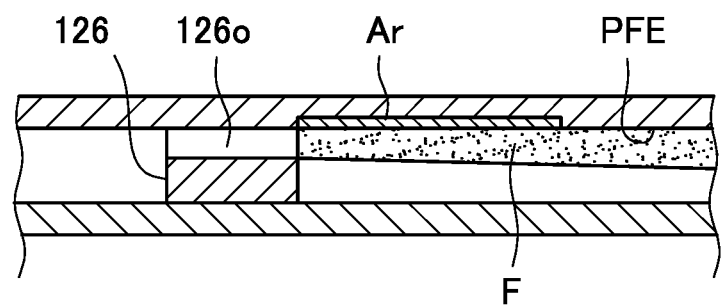
FIG. 3A is a schematic explanatory diagram illustrating a first variation of the liquid fuel injection body according to the embodiment of the present disclosure and illustrates a first example thereof.
Figure 3B:
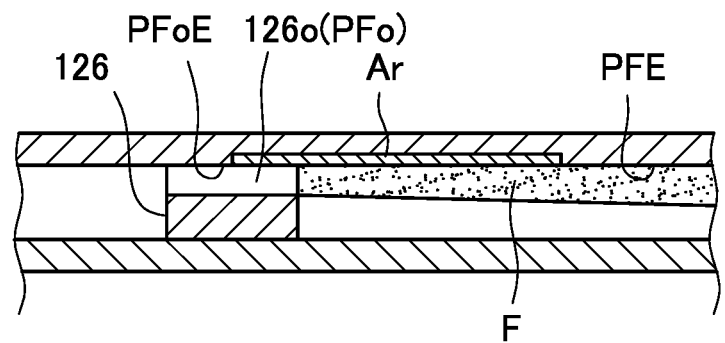
FIG. 3B is a schematic explanatory diagram illustrating the first variation of the liquid fuel injection body according to the embodiment of the present disclosure and illustrates a second example thereof.

FIGS. 3A to 3B are schematic explanatory diagrams illustrating a first variation of the liquid fuel injection body according to the embodiment of the present disclosure, where FIG. 3A illustrates a first example thereof, and FIG. 3B illustrates a second example. Note that, although both the drawings correspond to FIG. 2A, only the upper half thereof is illustrated for simplification.

In the first variation, a region Ar with higher surface roughness as compared with the other region is provided on the fuel passage outer wall PFE on the downstream side with respect to the orifice wall 126 as illustrated in FIG. 3A. In other words, the surface of the other region on the fuel passage outer wall PFE is formed to be relatively smooth while the surface of the region Ar is formed to be rougher than the other region.

The surface formed to be rough can be regarded as a surface having a number of minute projections, these projections are brought into contact with the liquid spreading along the surface with large contact angles, and a trigger of wetting the surface is thus provided. Therefore, the surface formed to be rough has high wettability with respect to the liquid since the surface has a number of portions that trigger wetting.

The surface roughness of the region Ar is preferably equal to or greater than Ra 0.5 (Ra: arithmetic mean roughness), for example.

By providing the region Ar with high surface roughness on the fuel passage outer wall PFE on the downstream side with respect to the orifice wall 126 in this manner, spreading of the injected flows F of the liquid fuel flowing out of the orifices 126o in the circumferential direction is promoted, and it is possible to set the thickness of the eventually formed annular liquid film to be more uniform in the circumferential direction.

Note that, although the example in which the region Ar with high surface roughness is provided only on the fuel passage outer wall PFE on the downstream side with respect to the orifice wall 126 has been described above, it is more preferable to expand the region toward the upstream side up to the wall (throttle passage outer wall) PFoE located outside the throttle passage PFo in the radial direction inside each orifice 126o, as illustrated in FIG. 3B.

Figure 4A:
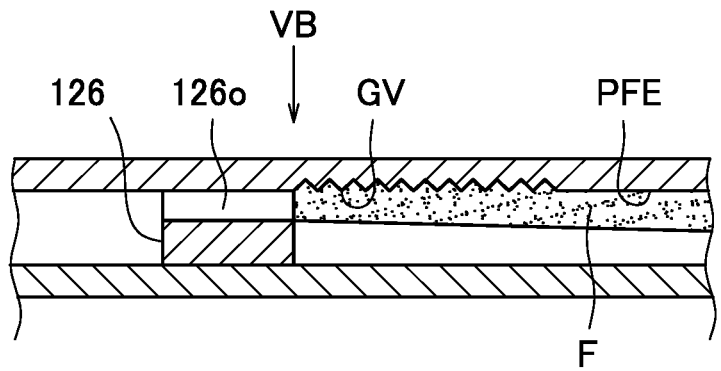
FIG. 4A is a schematic explanatory diagram illustrating a second variation of the liquid fuel injection body according to the embodiment of the present disclosure and illustrates a first example thereof.
Figure 4B:
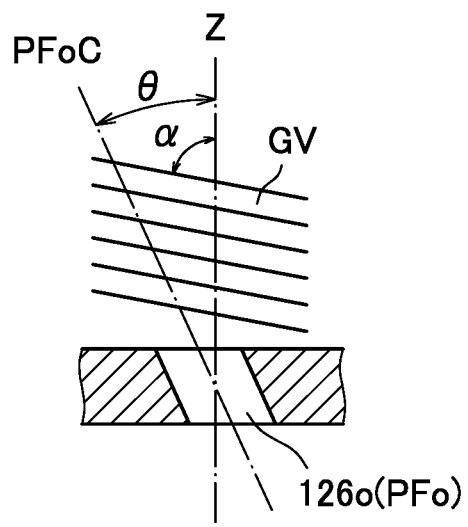
FIG. 4B is a schematic explanatory diagram illustrating the second variation of the liquid fuel injection body according to the embodiment of the present disclosure and illustrates a view in a direction of an arrow VB in FIG. 4A.
Figure 4C:
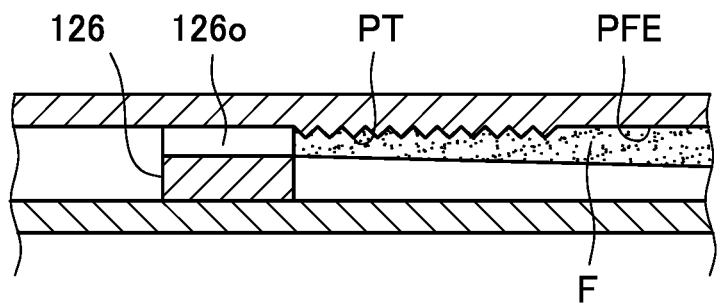
FIG. 4C is a schematic explanatory diagram illustrating the second variation of the liquid fuel injection body according to the embodiment of the present disclosure and illustrates a second example thereof.

FIGS. 4A to 4C are schematic explanatory diagrams illustrating a second variation of the liquid fuel injection body according to the embodiment of the present disclosure, where FIG. 4A illustrates a first example thereof, FIG. 4C illustrates a second example, and FIG. 4B illustrates a view in a direction of an arrow VB in FIG. 4A (that is, a view of a groove GV when seen from the outside in the radial direction). Note that, although FIGS. 4A and 4C are diagrams corresponding to FIG. 2A, only the upper half thereof is illustrated for simplification.

In the first example of the second variation, a spiral-shaped groove GV is provided in the fuel passage outer wall PFE on the downstream side with respect to the orifices 126o as illustrated in FIG. 4A.

The groove GV is provided as a recessed portion with a substantially triangular section cut from the inner surface of the fuel passage outer wall PFE on the downstream side with respect to the orifice wall 126 toward the outside in the radial direction.

The groove GV is provided to form a spiral swirling in the same direction as that of the injected flows F of the liquid fuel toward the downstream side. In other words, the groove GV is inclined on the same side (the left side in the drawing) as the direction of the injected flows F of the liquid fuel (that is, the direction of the passage center line PFoC of the throttle passage PFo formed by the orifices 126o) with reference to the axial direction Z when the groove GV is seen from the outside in the radial direction as illustrated in FIG. 4B. Further, an inclination angle α of the groove GV with respect to the axial direction Z is preferably greater than the inclination angle θ of the passage center line PFoC of the throttle passage PFo with respect to the axial direction Z (that is, α>θ) as illustrated in FIG. 4B.

Since the injected flows F of the liquid fuel flowing out of the orifices 126o efficiently spread on both sides in the circumferential direction along the groove GV by the spiral-shaped groove GV provided in the fuel passage outer wall PFE on the downstream side with respect to the orifices 126o in this manner, it is possible to set the thickness of the eventually formed annular liquid film to be more uniform in the circumferential direction.

Note that, although the groove GV cut from the inner surface of the fuel passage outer wall PFE toward the outside in the radial direction is provided in the first example, a spiral-shaped projecting portion PT with a substantially triangular section projecting from the inner surface of the fuel passage outer wall PFE toward the inside in the radial direction may be provided as in the second example illustrated in FIG. 4C instead.

Specifically, the projecting portion PT can be formed by weld-overlaying an appropriate material, for example, on the inner surface of the fuel passage outer wall PFE. Even in such a case in which the spiral-shaped projecting portion PT is provided, effects that are similar to those in the aforementioned case of the spiral-shaped groove GV can be obtained by a space formed between the projecting portions PT that are adjacent to each other in the spiral advancing direction. In other words, since the injected flows F of the liquid fuel flowing out of the orifices 126o efficiently spread on both sides in the circumferential direction along the space formed between the adjacent projecting portions PT, it is possible to set the thickness of the eventually formed annular liquid film to be more uniform in the circumferential direction.

Note that, although the example in which the spiral-shaped groove GV or the spiral-shaped projecting portion PT is provided only in the fuel passage outer wall PFE on the downstream side with respect to the orifice wall 126 has been described above, it is more preferable to expand such a structure toward the upstream side up to the wall (throttle passage outer wall) PFoE on the outside of the throttle passage PFo in the radial direction inside each orifice 126o (not illustrated).

Aspects of Present Disclosure

A liquid fuel injection body according to a first aspect of the present disclosure includes: an annular fuel passage extending in an axial direction and provided inside the liquid fuel injection body, the fuel passage is defined by a fuel passage outer wall located outward in a radial direction and a fuel passage inner wall located inward in the radial direction, a plurality of throttle passages disposed discretely in a circumferential direction are provided at a portion of the fuel passage on an upstream side with respect to a downstream end of the fuel passage, each of the throttle passages is defined by a throttle passage outer wall located outward in the radial direction and formed as a cylindrical surface, a throttle passage inner wall located inward in the radial direction, and two throttle passage side walls connecting end portions of the throttle passage outer wall and the throttle passage inner wall in the circumferential direction, and the throttle passage outer wall and the fuel passage outer wall are flush whereas the throttle passage inner wall and the fuel passage inner wall are not flush.

In the liquid fuel injection body according to a second aspect of the present disclosure, a structure for improving wettability with respect to the liquid fuel is provided at least at a portion of the fuel passage outer wall on a downstream side with respect to the throttle passage.

In the liquid fuel injection body according to a third aspect of the present disclosure, the structure for improving wettability with respect to the liquid fuel is also provided at least at a part of the throttle passage outer wall.

In the liquid fuel injection body according to a fourth aspect of the present disclosure, the structure for improving wettability is a region with high surface roughness provided on the fuel passage outer wall.

In the liquid fuel injection body according to a fifth aspect of the present disclosure, the structure for improving wettability is a spiral-shaped groove or a spiral-shaped projecting portion provided on the fuel passage outer wall.

EXPLANATION OF REFERENCE SIGNS

120 Liquid fuel injection body
PF Fuel passage
PFE Fuel passage outer wall
PFI Fuel passage inner wall
PFo Throttle passage
PFoE Throttle passage outer wall
PFoI Throttle passage inner wall
PFoS Throttle passage side wall
Ar Region with high surface roughness (structure for improving wettability with respect to liquid fuel)
GV Spiral-shaped groove (structure for improving wettability with respect to liquid fuel)
PT Spiral-shaped projecting portion (structure for improving wettability with respect to liquid fuel)

The invention claimed is:
1. A liquid fuel injection body comprising:
an annular fuel passage extending in an axial direction and provided inside the liquid fuel injection body,
wherein the fuel passage is defined by a fuel passage outer wall located outward in a radial direction and a fuel passage inner wall located inward in the radial direction, and a plurality of throttle passages disposed dis- cretely in a circumferential direction are provided at a portion of the fuel passage on an upstream side with respect to a downstream end of the fuel passage, each of the throttle passages is defined by a throttle passage outer wall located outward in the radial direction and formed as a cylindrical surface, a throttle passage inner wall located inward in the radial direction, and two throttle passage side walls connecting end portions of the throttle passage outer wall and the throttle passage inner wall in the circumferential direction, and the throttle passage outer wall and the fuel passage outer wall are flush whereas the throttle passage inner wall and the fuel passage inner wall are not flush, and a region with high surface roughness, a spiral-shaped groove, or a spiral-shaped projecting portion is provided at least at a portion of the fuel passage outer wall on a downstream side with respect to the throttle passage.

2. The liquid fuel injection body according to claim 1, wherein the region with high surface roughness, the spiral-shaped groove, or the spiral-shaped projecting portion is also provided at least at a part of the throttle passage outer wall.

* * * * *